US009195167B2

(12) United States Patent
Kiuchi et al.

(10) Patent No.: US 9,195,167 B2
(45) **Date of Patent: *Nov. 24, 2015**

(54) IMAGE FORMING APPARATUS

(71) Applicant: FUJI XEROX CO., LTD., Tokyo (JP)

(72) Inventors: Yutaka Kiuchi, Kanagawa (JP); Sakon Takahashi, Kanagawa (JP); Masayo Higashimura, Kanagawa (JP); Atsumi Kurita, Kanagawa (JP); Kunihiko Sato, Kanagawa (JP); Kosuke Yamada, Kanagawa (JP); Kazuhiko Arai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,966

(22) Filed: Nov. 18, 2014

(65) Prior Publication Data

US 2015/0072112 A1 Mar. 12, 2015

Related U.S. Application Data

(63) Continuation of application No. 14/072,169, filed on Nov. 5, 2013, now Pat. No. 8,923,712.

(30) Foreign Application Priority Data

Jun. 26, 2013 (JP) ................................ 2013-133724

(51) Int. Cl.
*G03B 15/08* (2006.01)
*G03G 15/08* (2006.01)

(52) U.S. Cl.
CPC ..... *G03G 15/0822* (2013.01); *Y10T 428/31938* (2015.04); *Y10T 428/31993* (2015.04)

(58) Field of Classification Search
CPC ................................................. G03G 15/0822
See application file for complete search history.

(56) References Cited

U.S. PATENT DOCUMENTS

| | | | | | |
|---|---|---|---|---|---|
| 6,042,917 | A * | 3/2000 | Schlueter et al. | ............... | 428/60 |
| 6,933,029 | B2 | 8/2005 | Ogino et al. | | |
| 8,923,712 | B1 * | 12/2014 | Kiuchi et al. | .................. | 399/44 |
| 2005/0201774 | A1 | 9/2005 | Yamagata | | |
| 2008/0112023 | A1 | 5/2008 | Watanabe | | |
| 2010/0148430 | A1 | 6/2010 | Fuda | | |
| 2011/0256475 | A1 | 10/2011 | Yu | | |

(Continued)

FOREIGN PATENT DOCUMENTS

| | | | |
|---|---|---|---|
| JP | 8-12133 | A | 1/1996 |
| JP | 2004-249694 | A | 9/2004 |
| JP | 2007-102039 | A | 4/2007 |
| JP | 2008-124828 | A | 5/2008 |

(Continued)

OTHER PUBLICATIONS

Communication dated Mar. 24, 2015 from the Japanese Patent Office in counterpart application No. 2013-133724.

*Primary Examiner* — W B Perkey
(74) *Attorney, Agent, or Firm* — Sughrue Mion, PLLC

(57) ABSTRACT

An image forming apparatus includes a toner image holding member, a transfer unit, and a supply unit. The toner image holding member holds a toner image. The transfer unit transfers the toner image held by the toner image holding member to a recording medium. The supply unit supplies powder such that the powder is interposed between an end portion of the recording medium and the toner image holding member and/or the transfer unit if the recording medium includes an intermediate adhesive layer.

17 Claims, 10 Drawing Sheets

(56) References Cited

U.S. PATENT DOCUMENTS

| | | | | |
|---|---|---|---|---|
| 2012/0237698 | A1 | 9/2012 | Funahashi et al. | |
| 2013/0078431 | A1 | 3/2013 | Sano et al. | |
| 2014/0140721 | A1 | 5/2014 | Fujita et al. | |
| 2015/0072112 | A1 * | 3/2015 | Kiuchi et al. | 428/195.1 |

FOREIGN PATENT DOCUMENTS

| | | | |
|---|---|---|---|
| JP | 2009-51589 | A | 3/2009 |
| JP | 2010-89845 | A | 4/2010 |
| JP | 2010-137947 | A | 6/2010 |

* cited by examiner

IMAGE FORMING APPARATUS

CROSS-REFERENCE TO RELATED APPLICATIONS

This application is a Continuation application of U.S. application Ser. No. 14/072,169, filed Nov. 5, 2013, which claims priority under 35 USC 119 from Japanese Patent Application No. 2013-133724 filed Jun. 26, 2013.

BACKGROUND

Technical Field

The present invention relates to an image forming apparatus.

SUMMARY

According to an aspect of the present invention, there is provided an image forming apparatus including:

a toner image holding member that holds a toner image;

a transfer unit that transfers the toner image held by the toner image holding member to a recording medium; and a supply unit that supplies powder such that the powder is interposed between an end portion of the recording medium and the toner image holding member and/or the transfer unit if the recording medium has a middle adhesive layer.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Exemplary Embodiment

Figure 1:
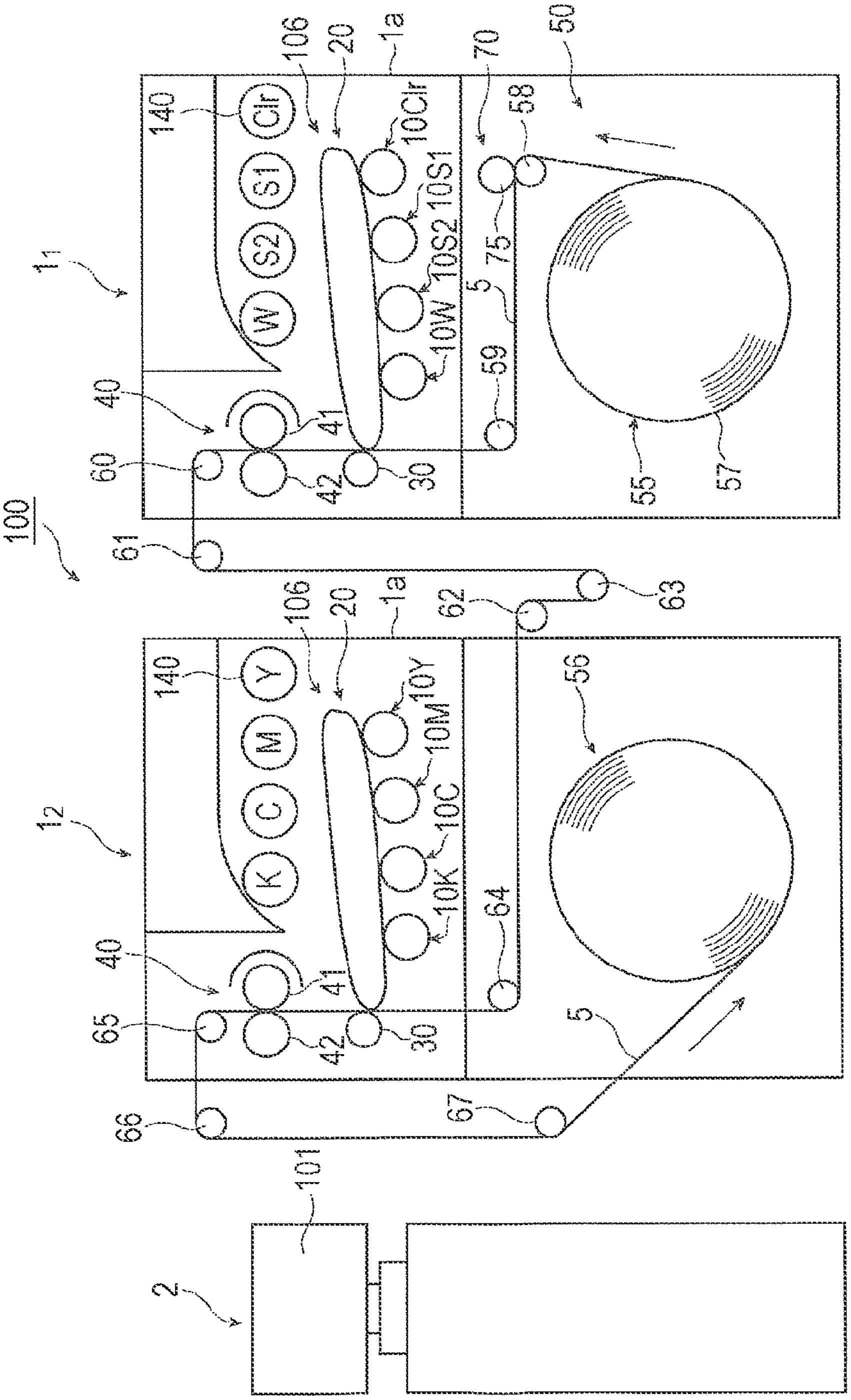
FIG. 1 is a schematic diagram illustrating an image forming apparatus according to a first exemplary embodiment of the present invention.

FIG. 1 illustrates an overview of the entire image forming apparatus according to a first exemplary embodiment.

<Overall Configuration of Image Forming Apparatus>

An image forming apparatus 100 according to the first exemplary embodiment is configured as a color printer, for example. The image forming apparatus 100 includes a first image forming apparatus $\mathbf{1}_1$ that forms an image using special toners such as a transparent toner and a white toner, a second image forming apparatus $\mathbf{1}_2$ that forms an image using toners in four colors, namely yellow (Y), magenta (M), cyan (C), and black (K), and a control device 2 that controls the first and second image forming apparatuses $\mathbf{1}_1$ and $\mathbf{1}_2$. The first and second image forming apparatuses $\mathbf{1}_1$ and $\mathbf{1}_2$ have basically the same configuration as each other except that the image forming apparatuses $\mathbf{1}_1$ and $\mathbf{1}_2$ form images in different colors. The image forming apparatus 1 includes an image forming section 106 that serves as an example of an image forming unit that forms an image on a recording medium on the basis of image data. The image forming section 106 includes plural image preparing devices 10, an intermediate transfer device 20, a paper feed device 50, a fixing device 40, and so forth. The image preparing devices 10 form a toner image to be developed using a toner that serves as a developer. The intermediate transfer device 20 holds the toner images formed by the image preparing devices 10 to transport the toner images finally to a second transfer position at which the toner images are transferred to the recording medium 5 through a second transfer. The paper feed device 50 feeds and transports the prescribed recording medium 5 to be supplied to the second transfer position of the intermediate transfer device 20. The fixing device 40 fixes the toner images on the recording medium 5 which have been subjected to the second transfer performed by the intermediate transfer device 20.

In the case where the image forming apparatus 100 is additionally equipped with an image reading device that serves as an image reading section (not illustrated) that allows input of a document image to be formed on the recording medium 5, for example, the image forming apparatus 100 may be configurated as a color copier. In FIG. 1, reference symbol 1*a* denotes a housing of the image forming apparatus. The housing 1*a* is formed from a support structure member, an outer covering, and so forth.

The image preparing devices 10 of the first image forming apparatus $\mathbf{1}_1$ are composed of four image preparing devices 10Clr, 10S1, 10S2, and 10W that exclusively form toner images in four colors, namely transparent (Clr), first special color (S1), second special color (S2), and white (W), respectively. The first special color (S1) may be gold, for example. The second special color (S2) may be silver, for example. The four image preparing devices 10 (Clr, S1, S2, W) are disposed side by side in line in the internal space of the housing 1*a*.

The image preparing devices 10 of the second image forming apparatus $\mathbf{1}_2$ are composed of four image preparing devices 10Y, 10M, 10C, and 10K that exclusively form toner images in four colors, namely yellow (Y), magenta (M), cyan (C), and black (K), respectively. The four image preparing devices 10 (Y, M, C, K) are also disposed side by side in line in the internal space of the housing 1*a*.

Figure 2:
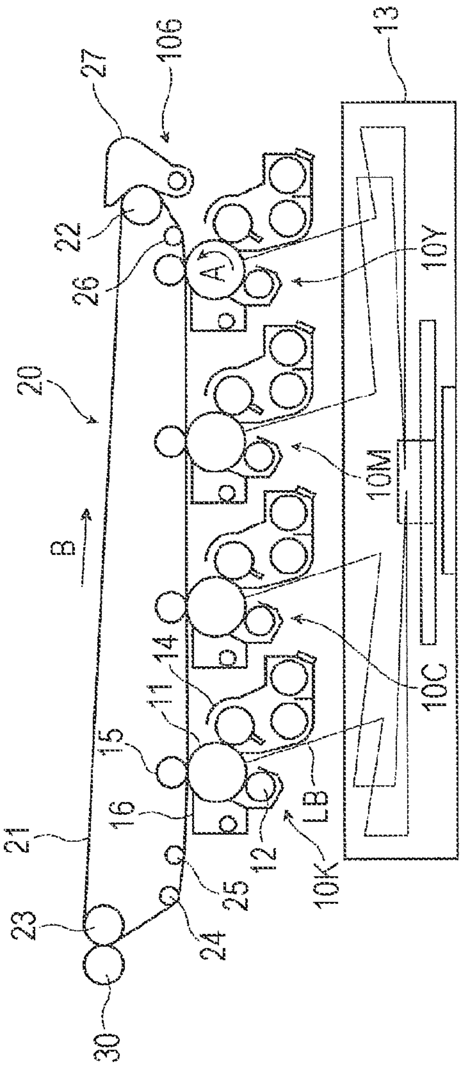
FIG. 2 is a diagram illustrating an image forming section of the image forming apparatus according to the first exemplary embodiment of the present invention.

As illustrated in FIG. 2, the image preparing devices 10 each include a photosensitive drum 11 that serves as an example of a rotary image holding member. The following various devices are principally disposed around the photosensitive drum 11. The devices include a charging device 12, an exposure device 13, a developing device 14, a first transfer device 15, a drum cleaning device 16, and so forth. The charging device 12 charges a peripheral surface (image holding surface) of the photosensitive drum 11, on which an image may be formed, with a prescribed potential. The exposure device 13 serves as an electrostatic latent image forming unit that radiates light LB based on information (signal) on an image to the charged peripheral surface of the photosensitive drum 11 to form an electrostatic latent image (for each color) with a potential difference. The developing device 14 serves as a developing unit that develops the electrostatic latent image using a toner of the developer for the corresponding color to form a toner image. The first transfer device 15 transfers the toner image to the intermediate transfer device 20. The drum cleaning device 16 removes attached matter such as a toner remaining on and adhering to the image holding surface of the photosensitive drum 11 after the first transfer to clean the photosensitive drum 11.

The photosensitive drum 11 has an image holding surface formed by providing a photoconductive layer (photosensitive layer) made of a photosensitive material on the peripheral surface of a grounded cylindrical or columnar base material. The photosensitive drum 11 is supported so as to receive power from a rotary drive device (not illustrated) to rotate in the direction indicated by the arrow A.

The charging device 12 is configurated as a contact charging roller disposed in contact with the photosensitive drum 11. A charging voltage is supplied to the charging device 12. In the case where the developing device 14 performs reversal development, a voltage or a current having the same polarity as the polarity for charging the toner supplied from the developing device 14 is supplied as the charging voltage.

The exposure device 13 radiates the light LB, formed in accordance with the information on the image input to the image forming apparatus 1, toward the peripheral surface of the photosensitive drum 11 after being charged to form an electrostatic latent image. When a latent image is to be formed, information (signal) on the image input in any manner to the image forming apparatus 1 and subjected to image processing performed by an image processing section is transmitted to the exposure device 13.

The developing device 14 includes a housing, a developing roller, two agitation/transport members, a layer thickness restricting member, and so forth. The housing includes an opening portion and a storing chamber for the developer, and houses the other components. The developing roller holds the developer, and transports the developer to a development region facing the photosensitive drum 11. The agitation/transport members, which may be screw augers, transport the developer to be supplied to the developing roller while agitating the developer. The layer thickness restricting member restricts the amount (layer thickness) of the developer held by the developing roller. A bias voltage for development from a power source device to be described later is supplied between the developing roller of the developing device 14 and the photosensitive drum 11. Power from a rotary drive device (not illustrated) is transmitted to the developing roller and the agitation/transport members to rotate the developing roller and the agitation/transport members in a prescribed direction. A two-part developer containing a non-magnetic toner and a magnetic carrier may be used as the developer, for example.

In FIG. 1, reference numeral 140 denotes a toner cartridge that serves as a developer storing container that stores a developer containing at least a toner to be supplied to the corresponding developing device 14. In the exemplary embodiment, only a toner is stored inside the toner cartridge 140.

The first transfer device 15 is a contact transfer device including a first transfer roller that rotates in contact with the peripheral surface of the photosensitive drum 11 and that is supplied with a first transfer voltage. A DC voltage having a polarity opposite to the polarity for charging the toner is supplied from a power source device (not illustrated) as the first transfer voltage.

The drum cleaning device 16 is composed of a body, a cleaning plate, a recovery device, and so forth. The body is in the form of a container that is partially open. The cleaning plate is disposed so as to contact the peripheral surface of the photosensitive drum 11 after the first transfer at a prescribed pressure to remove attached matter such as a residual toner. The recovery device recovers the attached matter removed by the cleaning plate.

As illustrated in FIGS. 1 and 2, the intermediate transfer device 20 is disposed at a position above the image preparing devices 10 (Y, M, C, K). The intermediate transfer device 20 is principally composed of an intermediate transfer belt 21, plural belt support rollers 22 to 26, a second transfer device 30, and a belt cleaning device 27. The intermediate transfer belt 21 rotates in the direction indicated by the arrow B while passing through first transfer positions between the photosensitive drums 11 and the first transfer devices 15 (first transfer rollers). The belt support rollers 22 to 26 rotatably support the intermediate transfer belt 21 by holding the intermediate transfer belt 21 in a desired state from the inner side. The second transfer device 30 is disposed on the side of the outer peripheral surface (image holding surface) of the intermediate transfer belt 21 supported by the belt support roller 23 to transfer the toner image on the intermediate transfer belt 21 to the recording medium 5 through a second transfer. The belt cleaning device 27 cleans the intermediate transfer belt 21 by removing attached matter such as a toner and paper powder remaining on and adhering to the outer peripheral surface of the intermediate transfer belt 21 after passing through the second transfer device 30.

An endless belt fabricated from a material obtained by dispersing a resistance adjusting agent such as carbon black etc. in a synthetic resin such as a polyimide resin or a polyamide resin, for example, is used as the intermediate transfer belt 21. The belt support roller 22 is configurated as a driving roller. The belt support roller 23 is configurated as a second transfer back-up roller. The belt support roller 24 is configurated as a tension applying roller. The belt support rollers 25 and 26 are each configurated as a driven roller that maintains the travel position etc. of the intermediate transfer belt 21.

As illustrated in FIG. 1, the second transfer device 30 is a contact transfer device including a second transfer roller 31 provided at the second transfer position, which is a portion of the outer peripheral surface of the intermediate transfer belt 21 supported by the belt support roller 23 in the intermediate transfer device 20. The second transfer roller 31 rotates in contact with the peripheral surface of the intermediate transfer belt 21, and is supplied with a second transfer voltage. A DC voltage having a polarity opposite to or the same as the polarity for charging the toner is supplied as the second transfer voltage to the second transfer device 31 or the support roller 23 of the intermediate transfer device 20.

The fixing device 40 includes a heating rotary member 41, a pressurizing rotary member 42, and so forth. The heating rotary member 41, which may be in the form of a roller or a belt, is heated by a heating unit such that the surface temperature is maintained at a predefined temperature. The pressurizing rotary member 42, which may be in the form of a roller or a belt, rotates in contact with the heating rotary member 41 at a prescribed pressure. In the fixing device 40, a contact portion at which the heating rotary member 41 and the pressurizing rotary member 42 contact each other serves as a fixation processing part at which a prescribed fixation process (heating and pressurization) is performed.

Figure 3A:
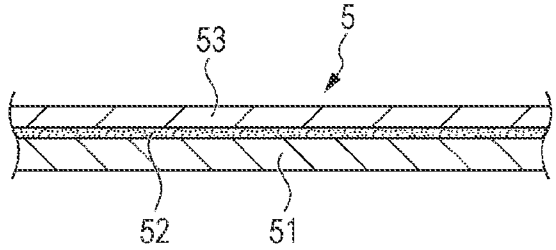
FIGS. 3A to 3C are each a cross-sectional view illustrating label paper.

The paper feed device 50 supplies a long strip of continuous paper 5 (rolled paper) as the recording medium. As illustrated in FIG. 3A, the continuous paper 5 may be formed from a synthetic resin such as polypropylene (PP) or paper such as glassine paper or high-quality paper, and may be so-called label paper including peeling paper 51 that generally serves as base paper to be discarded before use, an adhesive layer 52 serving as a middle layer and made of an adhesive material such as a paste, and a surface substrate 53 provided as the uppermost layer. The surface substrate 53 is printed with figures and characters to be used. The label paper 5 may be provided as rolled paper that is wound up into a roll with the surface substrate 53 positioned on the surface (outer peripheral surface) to serve as an image forming surface, for example, although the arrangement of the label paper 5 depends on the usage thereof.

The paper feed device 50 roughly includes a supply portion 55 on the feeding side disposed below the first image forming apparatus $\mathbf{1}_1$ to supply continuous paper, and a storage portion 56 on the winding side disposed below the second image forming apparatus $\mathbf{1}_2$ to wind up the continuous paper. The supply portion 55 includes a paper feed roller 57 formed from continuous paper wound up into a roll and disposed so as to be rotationally driven by a drive unit (not illustrated) in the counterclockwise direction to be fed. The supply portion 55 also includes transport rollers 58 and 59 that transport the continuous paper 5 fed from the paper feed roller 57 to a second transfer portion of the second transfer device 20. The first image forming apparatus $\mathbf{1}_1$ includes an ejection roller 60 provided above the fixing device 40 to eject the continuous paper 5 to which an image has been fixed to the outside.

Relay rollers 61 and 62 are provided in the space between the first image forming apparatus $\mathbf{1}_1$ and the second image forming apparatus $\mathbf{1}_2$. The relay rollers 61 and 62 supply and transport the continuous paper 5 ejected from the first image forming apparatus $\mathbf{1}_1$ to the second image forming apparatus $\mathbf{1}_2$. A tension applying roller 63 is disposed between the relay rollers 61 and 62 with a downward tension applied to the tension applying roller 63. The tension applying roller 63 applies a predefined tension to the continuous paper 5.

A transport roller 64 is provided below the second image forming apparatus $\mathbf{1}_2$. The transport roller 64 transports the introduced continuous paper 5 to the second transfer position of the intermediate transfer device 20. The second image forming apparatus $\mathbf{1}_2$ includes an ejection roller 65 provided above the fixing device 40 to eject the continuous paper 5 to the outside. Transport rollers 66 and 67 are rotatably disposed outside the second image forming apparatus $\mathbf{1}_2$. The transport rollers 66 and 67 transport the continuous paper 5 ejected from the second image forming apparatus $\mathbf{1}_2$ to a winding roller disposed below the second image forming apparatus $\mathbf{1}_2$.

Figure 4:
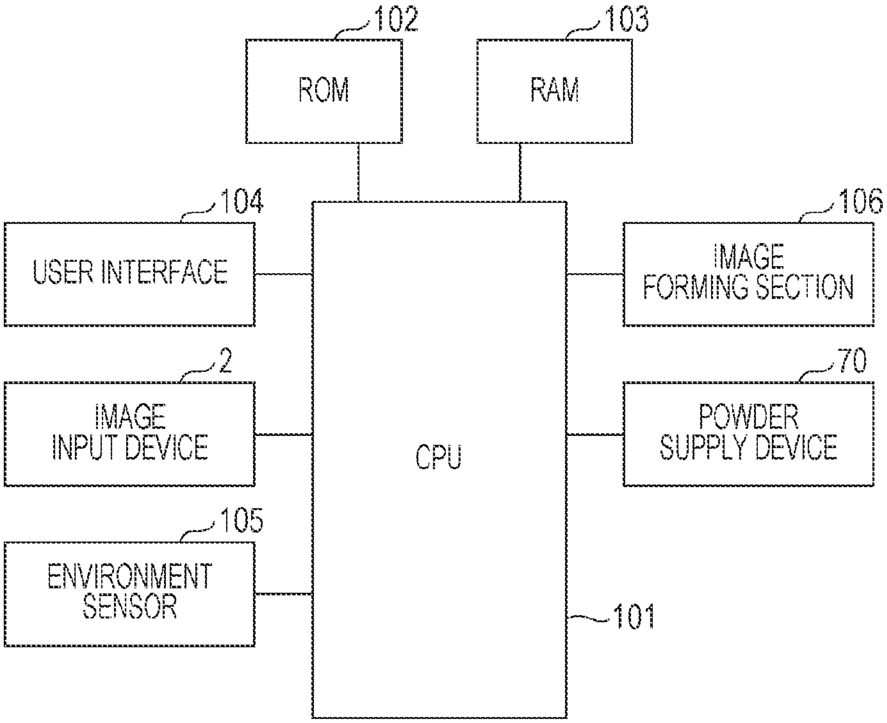
FIG. 4 is a block diagram illustrating a control circuit.

FIG. 4 illustrates a control device that controls operation of the image forming apparatus 100.

In FIG. 4, reference numeral 101 denotes a CPU that comprehensively controls image forming operation of the image forming apparatus 100. The CPU 101 controls the image forming operation with reference to programs stored in a ROM 102, parameters stored in a RAM 103, and so forth.

Reference numeral 104 denotes a user interface that allows a user to input the type and the size of the recording medium 5 for forming an image, the number of sheets to be printed, and so forth. Reference numeral 2 denotes an image input device that allows input of an image. Reference numeral 105 denotes an environment sensor that senses the temperature of the environment around the image forming apparatus 100. Reference numeral 106 denotes an image forming section of the first and second image forming apparatuses $\mathbf{1}_1$ and $\mathbf{1}_2$. Reference numeral 70 denotes a powder supply device to be discussed later.

<Basic Operation of Image Forming Apparatus>

Basic image forming operation performed by the image forming apparatus 100 will be described below.

Image forming operation for forming a full-color image by combining toner images in four colors (Y, M, C, K) using the four image preparing devices 10 (Y, M, C, K) of the second image forming apparatus $\mathbf{1}_2$ will be described. The same image forming operation is performed to form one or more toner images in the four colors (Clr, S1, S2, W) using the four image preparing devices 10 (Clr, S1, S2, W) of the first image forming apparatus $\mathbf{1}_1$.

When the image forming apparatus 1 receives command information requesting image forming operation (printing), the four image preparing devices 10 (Y, M, C, K), the intermediate transfer device 20, the second transfer device 30, the fixing device 40, and so forth are started.

In each of the image preparing devices 10 (Y, M, C, K), first, the photosensitive drum 11 rotates in the direction indicated by the arrow A, and the charging device 12 charges the surface of the photosensitive drum 11 with a prescribed polarity (in the first exemplary embodiment, negative polarity) and a predefined potential. Then, the exposure device 13 radiates the surface of the photosensitive drum 11 after being charged with light LB emitted on the basis of a signal for an image obtained by converting information on an image input to the image forming apparatus 1 into each color component (Y, M, C, K). Thus, an electrostatic latent image for each color component with a prescribed potential difference is formed on the surface of the photosensitive drum 11.

Then, the developing device 14 (Y, M, C, K) develops the electrostatic latent image for each color component formed on the photosensitive drum 11 by supplying a toner for the corresponding color (Y, M, C, K) charged with a prescribed polarity (negative polarity) for electrostatic adhesion. As a result of the development, the electrostatic latent images for the various color components formed on the photosensitive drums 11 are rendered manifest as toner images for the four colors (Y, M, C, K) developed using toners for the corresponding colors.

Then, when the toner image in each color formed on the photosensitive drum 11 of the image preparing device 10 (Y, M, C, K) is transported to the first transfer position, the first transfer device 15 performs a first transfer on the toner image in each color such that the toner images in the various colors are sequentially superposed on the intermediate transfer belt 21 of the intermediate transfer device 20 which rotates in the direction indicated by the arrow B.

In the image preparing devices 10 which have finished the first transfer, the drum cleaning device 16 removes, or scrapes off, attached matter such as a toner remaining on the surface of the photosensitive drum 11 to clean the surface of the photosensitive drum 11. This allows the image preparing devices 10 to be ready for the next image preparing operation.

Then, the intermediate transfer device 20 transports the toner images which have been subjected to the first transfer to the second transfer position through rotation of the intermediate transfer belt 21. Meanwhile, the paper feed device 50 feeds the continuous paper 5 to a paper feed/transport path by causing the continuous paper 5 to pass through a prescribed transport path extending from the supply portion 55 to the winding portion 56 prior to image preparing operation.

At the second transfer position, the second transfer device 30 collectively performs a second transfer of the toner images on the intermediate transfer belt 21 onto the continuous paper 5. In the intermediate transfer device 20 which has finished the second transfer, the belt cleaning device 27 removes attached matter such as a toner remaining on the surface of the intermediate transfer belt 21 after the second transfer.

Then, the continuous paper 5, onto which the toner images have been transferred through the second transfer, is peeled from the intermediate transfer belt 21 and the second transfer device 31, and thereafter transported to the fixing device 40. The fixing device 40 performs a necessary fixation process (heating and pressurization) to fix unfixed toner images to the continuous paper 5. Finally, the continuous paper 5 which has been subjected to the fixation is ejected to the outside by the transport roller 65.

As a result of the operation described above, the continuous paper 5 is output with a full-color image formed thereon by combining the toner images in the four colors.

<Configuration of Specific Portion of Image Forming Apparatus>

Figure 5:
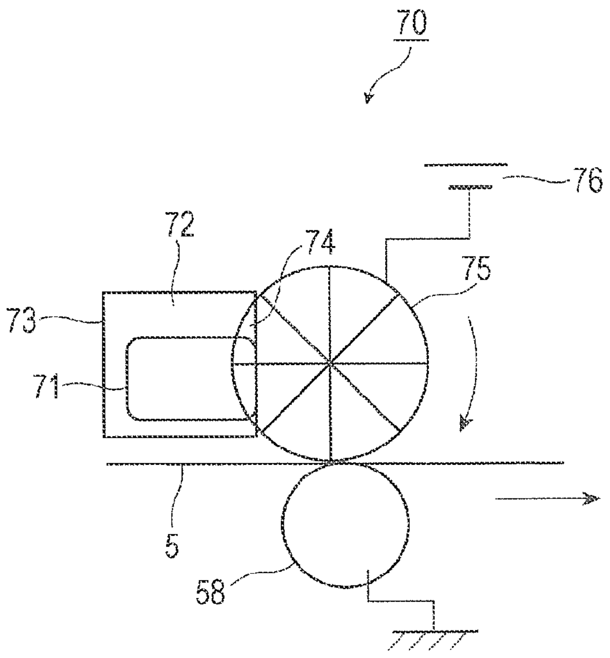
FIG. 5 is a diagram illustrating a powder supply device.

FIG. 5 is a diagram illustrating the powder supply device.

As illustrated in FIG. 5, the powder supply device 70 includes a housing 73 and a rotary brush 75. A storing chamber 72 for powder 71 is formed inside the housing 73. The rotary brush 75 is a brush-like member provided outside an opening portion 74 of the housing 73 and disposed such that a part of the outer periphery of the rotary brush 75 is positioned inside the housing 73 via the opening portion 74. The rotary brush 75 is disposed to extend over the entire length of the continuous paper 5 in the width direction. The rotary brush 75 is formed by densely transplanting conductive or semiconductive fibers along the radial directions. The rotary brush 75 may be rotated in the direction opposite to the direction of movement of the continuous paper 5 by a drive unit (not illustrated). A bias power source 76 applies a bias voltage set to a polarity opposite to the polarity for charging the powder 71 to the rotary brush 75. The transport roller 58 is grounded.

It is a matter of course that the powder 71 stored inside the powder supply device 70 is originally powdery. However, the powder 71 may be initially solid, and supplied as powder when scraped off by the rotary brush 75. The powder 71 may be a toner such as a transparent toner or a white toner, an inorganic material such as silica, a lubricant such as ZnSt or PTFE, an abrasive such as a cerium oxide contained in the developer, or the like, for example.

<Operation of Specific Portion of Image Formation Apparatus>

Operation of the specific portion of the image forming apparatus will be described below.

Figure 3B:
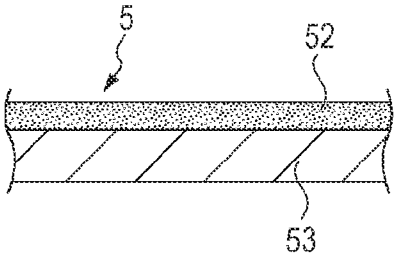
Figure 3C:
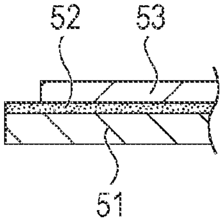

In the image forming apparatus 100, as discussed above, the first and second image forming apparatuses $\mathbf{1}_1$ and $\mathbf{1}_2$ form an image using the special toners such as the transparent toner and the white toner and the toners in yellow (Y), magenta (M), cyan (C), and black (K) on the surface of the surface substrate 53 of the label paper 5 serving as the continuous paper. The respective raw materials forming the peeling paper 51 and the surface substrate 53 of the label paper 5 are different from each other. Therefore, as illustrated in FIGS. 3B and 3C, the adhesive layer 52 may be exposed on the surface at an end portion of the label paper 5 when the surface substrate 53 is shrunk to a greater degree because of a difference in rate of shrinkage between the raw materials, such as when the label paper 5 absorbs moisture or becomes dried.

Then, if the adhesive exposed on the surface at the end portion of the label paper 5 contacts the transport roller 59, the intermediate transfer belt 21, or the second transfer roller 30 as illustrated in FIG. 1, the adhesive forming the adhesive layer may pass from the label paper 5 to the transport roller 59, the intermediate transfer belt 21, or the like to adhere thereto.

Figure 6:
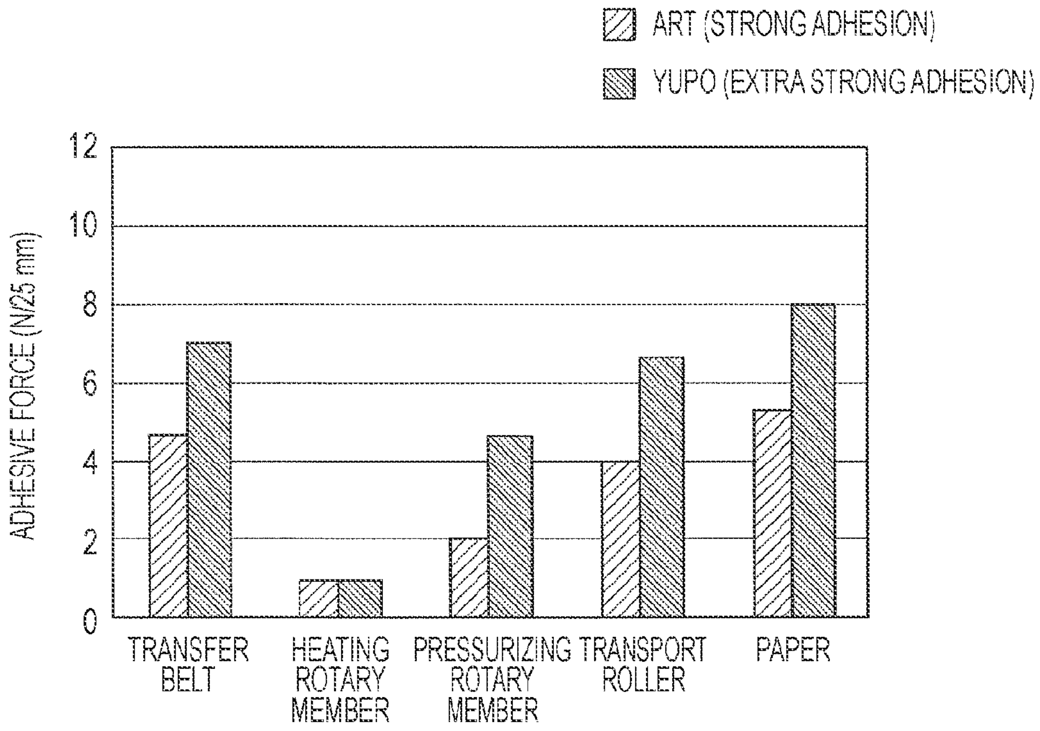
FIG. 6 is a graph illustrating the adhesive force for various types of the label paper.

FIG. 6 is a graph illustrating the results of a peel test conducted to measure the adhesive force of the label paper 5 to the intermediate transfer belt 21, the heating rotary member 41 and the pressurizing rotary member 42 of the fixing device 40, the transport roller 59, and plain paper. As the label paper, Art E/PW (strong adhesion)/8R(N) manufactured by Lintec Corporation and N Yupo 80/S15 (extra strong adhesion)/G8B manufactured by Oji Tac Co., Ltd. are used.

As is clear from FIG. 6, both the two types of the label paper 5 strongly adhere to the intermediate transfer belt 21, the transport roller 59, and so forth so that the adhesive tends to pass and adhere thereto. A release layer is applied to the surface of the heating rotary member 41 of the fixing device 40. Therefore, none of the two types of the label paper 5 strongly adheres to the heating rotary member 41. Both the two types of the label paper 5 adhere to the pressurizing rotary member 42 more strongly than to the heating rotary member 41. However, the inventors have found that it is less likely that the adhesive passes and adheres to the pressurizing rotary member 42 than to the other members. Both the two types of the label paper 5 adhere to the plain paper most strongly. However, the label paper 5 does not contact the plain paper in the image forming apparatus 1, and the plain paper does not raise an issue.

In the exemplary embodiment, the powder supply device 70 is disposed at a position opposite to the transport roller 58 which transports the continuous paper 5 supplied from the paper feed roller 57 as illustrated in FIG. 1, and the powder 71 is supplied by the rotary brush 75 to the surface of the label paper serving as the continuous paper 5 as illustrated in FIG. 5. At this time, a bias voltage for electrostatically adsorbing the powder 71 is applied to the rotary brush 75. Therefore, the powder 71 is held on the rotary brush 75 by an electrostatic force, and does not adhere to the surface of the label paper 5. Most of the powder 71 adheres to the exposed adhesive of the label paper 5 having an adhesive force exceeding the force for holding the powder 71 on the rotary brush 75.

Therefore, even in the case where the label paper serving as the continuous paper 5 is transported to pass through the second transfer position at which the label paper contacts the intermediate transfer belt 21, the powder is interposed between the exposed adhesive of the label paper 5 and the intermediate transfer belt 21.

Likewise, even when the label paper serving as the continuous paper 5 passes through the fixing device 40, the transport roller 59, or the like, the powder is interposed between the exposed adhesive of the label paper 5 and a contacting member of the transport roller 59.

Although the powder supply device 70 may supply the powder 71 at all times, the powder supply device 70 may supply the powder 71 only in the case where the temperature of the environment sensed by the environment sensor 105 is equal to or more than a threshold or in the case where the continuous paper 5 designated through the user interface 104 is predefined label paper. In this case, the powder supply device 70 may be brought into and out of contact with the continuous paper 5 by a contact/release mechanism (not illustrated). Various types of the label paper may be used such as label paper having a large amount of adhesive and label paper formed using an adhesive material with a low glass transition point temperature for cold storage or the like.

Second Exemplary Embodiment

Figure 7:
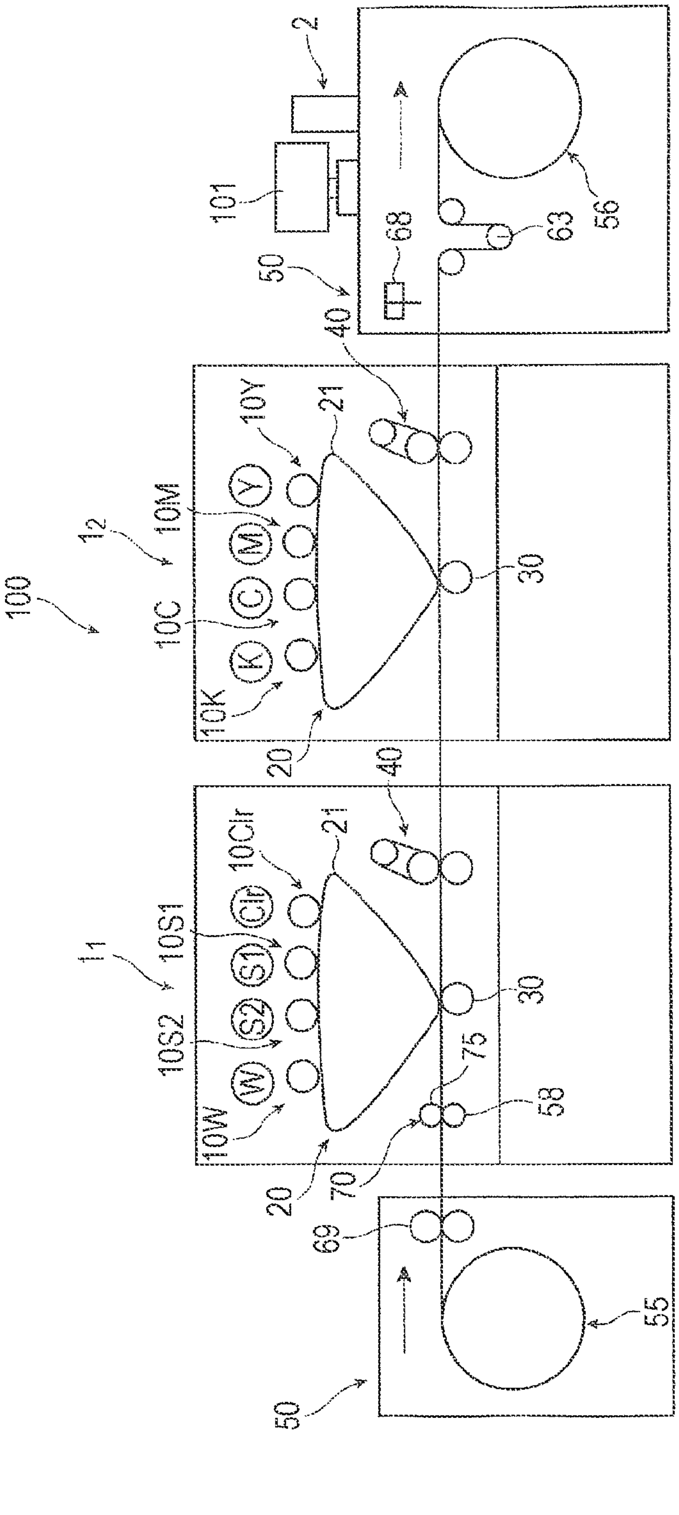
FIG. 7 is a diagram illustrating an image forming apparatus according to a second exemplary embodiment of the present invention.
Figure 8:
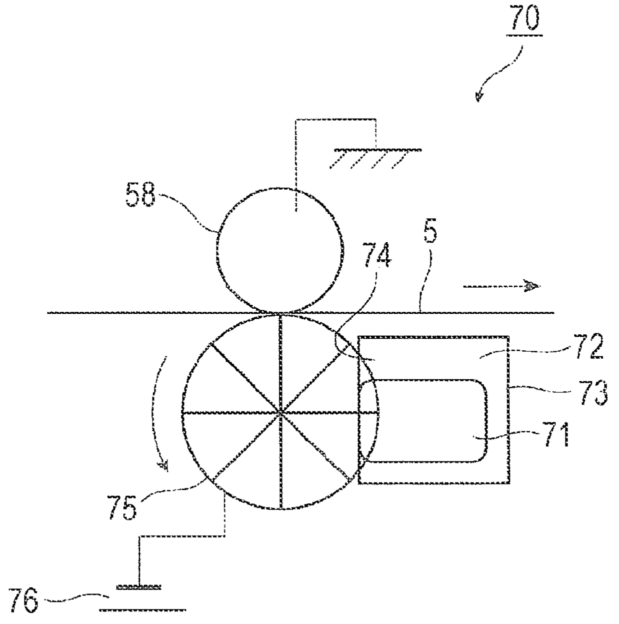
FIG. 8 is a diagram illustrating a portion of the image forming apparatus according to the second exemplary embodiment of the present invention.

FIG. 7 illustrates an overview of the entire image forming apparatus according to a second exemplary embodiment.

<Overall Configuration of Image Forming Apparatus>

As in the first exemplary embodiment, the image forming apparatus 100 according to the second exemplary embodiment includes a first image forming apparatus $1_1$ that forms an image using special toners such as a transparent toner and a white toner and a second image forming apparatus $1_2$ that forms an image using toners in four colors, namely yellow (Y), magenta (M), cyan (C), and black (K). However, the first and second image forming apparatuses $1_1$ and $1_2$ are different in configuration from those according to the first exemplary embodiment, and accordingly the paper feed device for continuous paper is also different in configuration from that according to the first exemplary embodiment.

In the first and second image forming apparatuses $1_1$ and $1_2$ according to the second exemplary embodiment, as illustrated in FIG. 7, the four image preparing devices 10 (Y, M, C, K) are disposed above the intermediate transfer belt 21, and the second transfer roller is disposed such that the second transfer position at which toner images transferred onto the intermediate transfer belt 21 are transferred to the recording medium is at the lowermost position in the movement path of the intermediate transfer belt 21.

The continuous paper 5 is fed by a transport roller pair 69 from the supply portion 55 disposed upstream of the first image forming apparatus $1_1$, and passes through the second transport portion and the fixing device 40 of the first image forming apparatus $1_1$ to be transported to the second image forming apparatus $1_2$. The continuous paper transported to the second image forming apparatus $1_2$ passes through the second transfer portion and the fixing device 40 of the second image forming apparatus $1_2$ to be wound up by the winding portion 56 of the paper feed device 50 disposed downstream of the second image forming apparatus $1_2$. The tension applying roller 63 is disposed upstream of the winding portion 56 to apply a tension to the continuous paper. The paper feed device 50 including the winding portion 56 also functions as the control device 2.

In the second exemplary embodiment, as illustrated in FIG. 7, the powder supply device 70 is disposed at a position opposite to the transport roller 58 disposed on the introduction side of the first image forming apparatus $1_1$.

In the second exemplary embodiment, the powder is supplied from the powder supply device 70 to the continuous paper 5 introduced into the first image forming apparatus $1_1$.

In the second exemplary embodiment, as illustrated in FIG. 7, the powder supply device 70 supplies the powder to the image forming surface of the recording medium 5 so that the powder is interposed between the recording medium 5 and the intermediate transfer belt 21. However, the present invention is not limited thereto. The powder supply device 70 may be disposed on the back side (non-image forming surface) of the recording medium 5 to supply the powder to the non-image forming surface of the recording medium 5 so that the powder is interposed between the recording medium 5 and the second transfer roller 30. In addition, the powder supply device 70 may be disposed on both sides of the recording medium 5 so that the powder is supplied to both the image forming surface and the non-image forming surface of the recording medium 5.

Third Exemplary Embodiment

Figure 9:
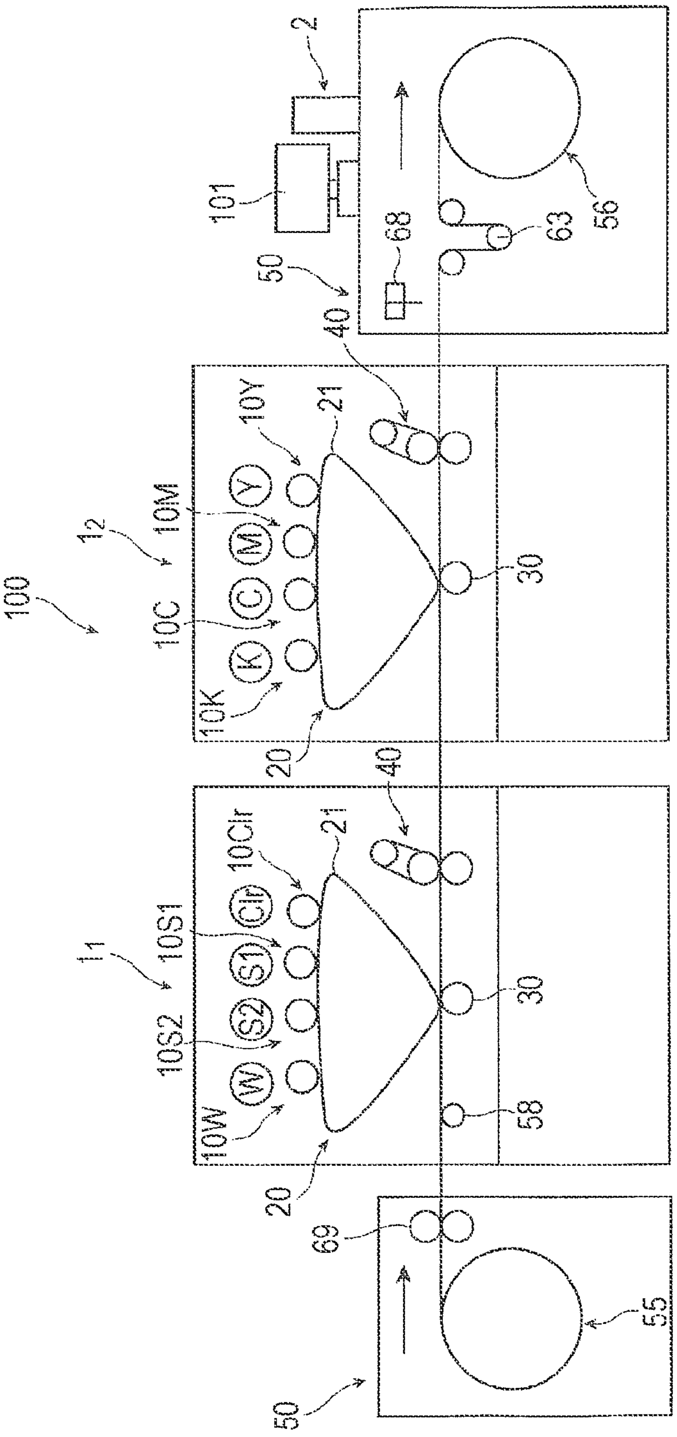
FIG. 9 is a diagram illustrating an image forming apparatus according to a third exemplary embodiment of the present invention.

FIG. 9 illustrates an overview of the entire image forming apparatus according to a third exemplary embodiment.

<Overall Configuration of Image Forming Apparatus>

In the image forming apparatus 100 according to the third exemplary embodiment, toners as powder are supplied to the intermediate transfer belt 21 from the image preparing devices 10 of the image forming apparatuses 1, rather than powder is supplied from the powder supply device.

Figure 10A:
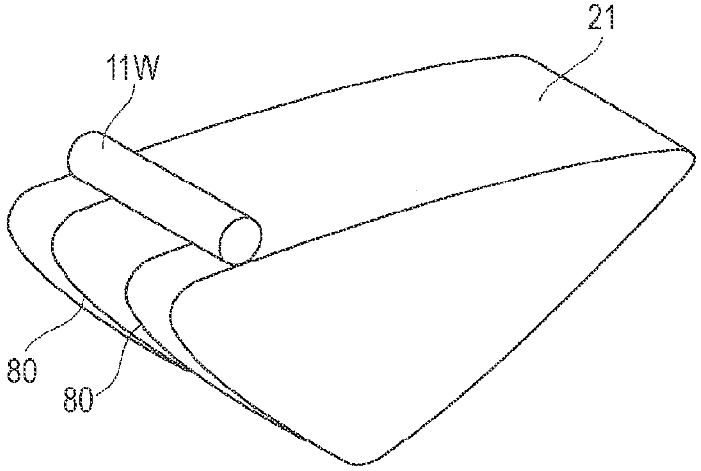
FIGS. 10A and 10B are each a diagram illustrating a portion of the image forming apparatus according to the third exemplary embodiment of the present invention.
Figure 10B:
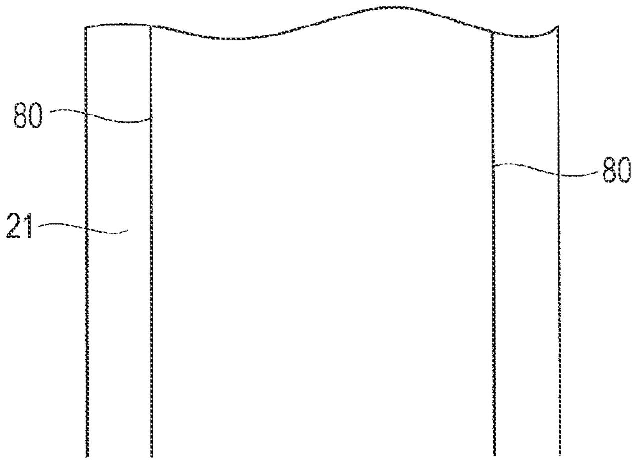

In the first image forming apparatus $1_1$, when supply of the continuous paper 5 is started, the positions of end portions of the paper are sensed by a paper edge sensor (not illustrated) provided between the transport roller 58 and the second transfer device 30 to sense the positions of the end portions of the paper. Based on the sensed positions of the end portions of the paper, the image preparing device 10W for white forms a straight toner image 80 extending along the direction of transport of the continuous paper 5 at the positions corresponding to both the end portions of the continuous paper 5 in a direction intersecting the direction of transport of the continuous paper 5. The width of the toner image 80 formed may be determined on the basis of the amount of inclination with respect to the direction of transport of the paper and the predicted amount of shrinkage of the paper that may be caused when the paper absorbs moisture or becomes dried, and may be about 200 μm to 2 mm. In the case where the posture of the paper transported is varied greatly, the width of the toner image 80 may be about 7 mm. The straight toner image 80 may be formed using a screen (at a tone of 50% or less, for example) that is different from a screen used for a normal image to be printed. As illustrated in FIGS. 10A and 10B, the straight toner image 80 formed by the image preparing device 10W for white is transferred to the intermediate transfer belt 21 through a first transfer, and transferred to the exposed adhesive positioned at the end portions of the continuous paper when the continuous paper passes through the second transfer position for the intermediate transfer belt 21.

Therefore, when the continuous paper 5 formed from the label paper passes through the second transfer position for the intermediate transfer belt 21, the exposed adhesive of the label paper 5 and the intermediate transfer belt 21 contact each other via the toner image 80 as the powder.

Even in the case where the label paper 5 contacts the transport roller or the like, the toner has adhered to the exposed adhesive of the label paper 5.

The toner for forming the toner image 80 is preferably in an unnoticeable color such as a white toner, a transparent toner, or a yellow toner. Because a minute amount of toner adheres to the label paper or the like, however, a yellow (Y), magenta (M), cyan (C), or black (K) toner may also be used.

The toner for forming the toner image is not limited to one type of toner (in one color), and plural types of toner may be used to form toner images that extend alternately over predefined lengths.

The toner image as powder may be formed in not only a non-image portion but also in an image portion, and may be formed to extend over the entire length of the continuous paper depending on the environmental conditions, the type of the label paper, or the like.

In the exemplary embodiments described above, the recording medium is continuous paper. However, the recording medium is not limited to continuous paper, and may be a cut sheet of paper that has been cut in advance to a prescribed size. In this case, powder is preferably supplied to the four sides corresponding to the periphery of the cut sheet of paper.

In the embodiments described above, the image forming apparatus includes the first image forming apparatus $1_1$ and the second image forming apparatus $1_2$. However, the image forming apparatus may include only the second image forming apparatus $1_2$. In addition, the second image forming apparatus $1_2$ may be provided with the powder supply device 70. In this case, the present invention may be applied in a variety of forms as necessary. For example, the toner cartridge 140 for a transparent toner or a white toner may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A powder applying apparatus comprising:

a powder supply unit configured to supply powder to at least one end of a recording medium in a width direction, wherein the recording medium comprises at least a middle adhesive layer, and wherein a toner image is formed on a surface of the recording medium.

2. A medium comprising:

a top layer;

a bottom layer; and a middle adhesive layer interposed between the top layer and the bottom layer, an exposed portion of an end of the middle adhesive layer being covered with powder.

3. A medium according to claim 2, wherein a toner image is formed on a surface of the medium by an image forming apparatus, and wherein the powder is configured to prevent the exposed portion of the end from directly contacting with the image forming apparatus.

4. A conveying apparatus comprising:

a conveying unit configured to convey a recording medium on which a toner image is formed by an image forming unit; and a powder supply unit disposed at an upstream side of the image forming unit and configured to supply powder to at least one end of a recording medium in a width direction, wherein the recording medium comprises at least a middle adhesive layer, and wherein a toner image is formed on a surface of the recording medium.

5. The powder applying apparatus according to claim 1, wherein the powder supply unit comprises a brush-like member configured to hold the powder.

6. The conveying apparatus according to claim 4, wherein the powder supply unit comprises a brush-like member configured to hold the powder.

7. The powder applying apparatus according to claim 5, wherein the brush-like member is configured to receive a bias voltage that suppresses transfer of the powder to the recording medium.

8. The conveying apparatus according to claim 6, wherein the brush-like member is configured to receive a bias voltage that suppresses transfer of the powder to the recording medium.

9. The powder applying apparatus according to claim 1, wherein the recording medium is a strip of continuous, rolled paper.

10. The medium according to claim 2, wherein the medium is a strip of continuous, rolled paper.

11. The conveying apparatus according to claim 4, wherein the recording medium is a strip of continuous, rolled paper.

12. The powder applying apparatus according to claim 9, further comprising a paper feed device configured to supply the strip of continuous, rolled paper.

13. The conveying apparatus according to claim 11, further comprising a paper feed device configured to supply the strip of continuous, rolled paper.

14. The powder applying apparatus according to claim 1, further comprising a controller configured to control a position where the powder supply unit supplies the powder in response to a type of the recording medium.

15. The conveying apparatus according to claim 4, further comprising a controller configured to control a position where the powder supply unit supplies the powder in response to a type of the recording medium.

16. The powder applying apparatus according to claim 1, further comprising a controller configured to control a position where the powder supply unit supplies the powder in response to a result sensed by a sensor.

17. The conveying apparatus according to claim 4, further comprising a controller configured to control a position where the powder supply unit supplies the powder in response to a result sensed by a sensor.

* * * * *